3,461,854
WATER HEATING SYSTEM
Henry Toni, Burlington, and Count Lee Zoeckler, Stratford, Ontario, Canada, assignors to A. O. Smith Corporation, Milwaukee, Wis., a corporation of New York
Filed Jan. 8, 1968, Ser. No. 696,412
Int. Cl. F24h 1/10
U.S. Cl. 126—351    6 Claims

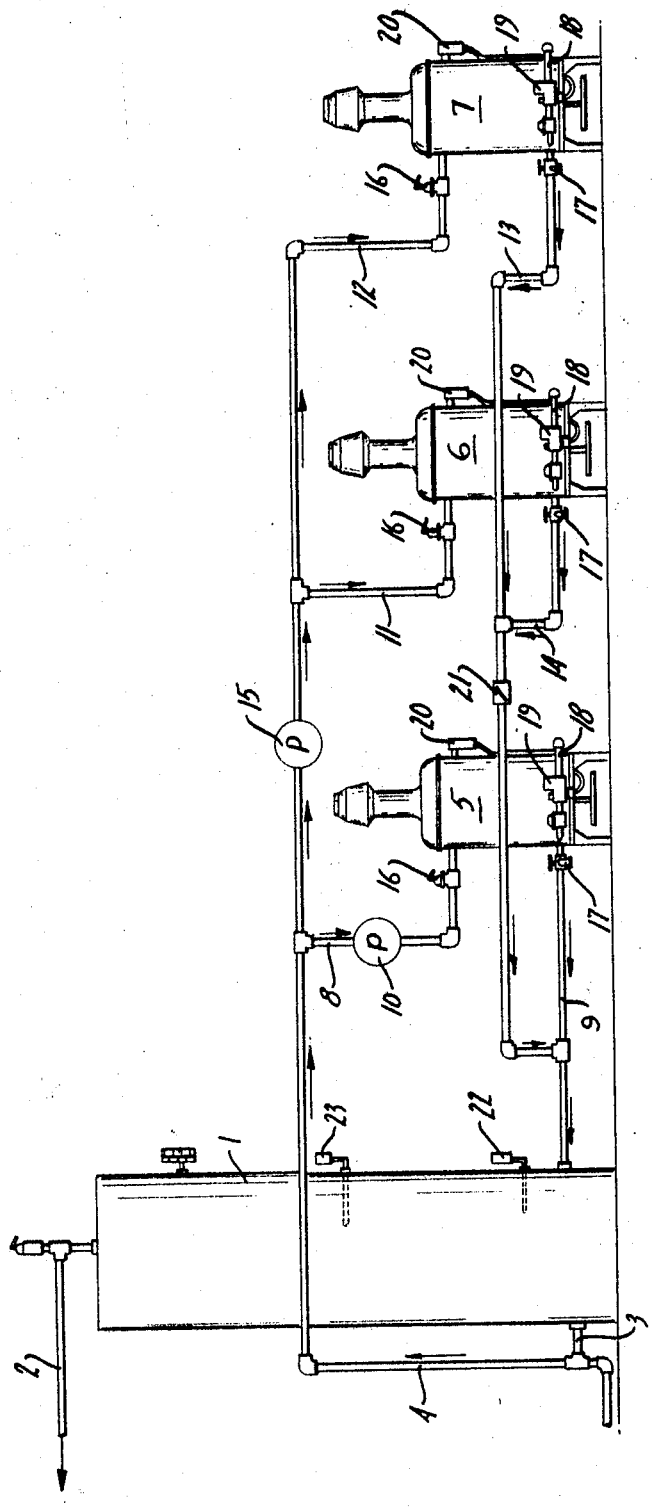

ABSTRACT OF THE DISCLOSURE

The invention relates to a water heating system for commercial or industrial establishments. A hot water storage tank and a water heater are connected by piping in a first closed flow system, while the water storage tank and a second water heater are connected by piping in a second closed flow system and a pump is located within each closed system. Two thermostats are located within the hot water storage tank at different levels and each thermostat is operably connected to the heater and pump of one of the closed systems. During off-peak periods when small volumes of water are drawn from the tank, the lower thermostat operates the water heater and pump of the corresponding closed system to supply heated water to the storage tank. During peak periods when larger volumes of water are being drawn from the tank both thermostats operate to actuate the water heaters and pumps of both closed systems so that both systems act to supply heated water to the storage tank.

---

Commercial water heating systems for apartment houses, car washes, industrial plants and the like, frequently utilize a series or bank of instantaneous-type water heaters which are connected, along with a pump, in a closed system with a water storage tank. When the temperature of the water in the storage tank falls below the setting of the thermostat, the thermostat operates the bank of heaters and the pump to supply heated water to the tank. When the temperature of the water within the tank has regained the temperature setting of the thermostat, the heaters and pump are deactivated.

The number of water heaters used in the particular water heating system is determined by the desired capacity of the system, and in the usual system all of the water heaters are generally operated whenever the thermostat in the storage tank calls for heat.

The present invention is directed to a commercial water heating system in which only one water heater is operated during periods when a small volume of water is being drawn from the storage tank and a series of water heaters are operated during periods when large volumes of water are being drawn from the storage tank. More specifically, the hot water storage tank and an instantaneous-type heater are connected by piping in a first closed flow heating system, while the water storage tank is also connected with one or more instantaneous-type heaters in a second closed flow heating system, and a pump is located in each flow system. Two thermostats are mounted within the water storage tank at different vertical levels, and each thermostat is operably connected to the heater and the pump in one of the closed flow systems.

During off-peak periods, when small volumes of water are drawn from the storage tank, cold water is supplied to the bottom of the storage tank and when the temperature of the water in the lower end of the tank falls below the setting of the lower thermostat, the thermostat will act to operate the heater and the pump in one of the closed systems. Operation of the pump will draw water from the tank to the heater and return heated water to the lower end of the storage tank. When the temperature in the tank has regained the setting of the lower thermostat, the thermostat will act to stop operation of the heater and the pump.

When large volumes of water are drawn from the storage tank, correspondingly large volumes of cold water enter the tank and both the lower and upper thermostats will be actuated. Actuation of the lower thermostat serves to operate the heater and pump of the first closed flow system, while the upper thermostat will act to operate the heater and the pump of the second flow system so that heated water is then supplied from both heaters to the tank.

As the temperature of the stored water increases, due to the supply of heated water from both systems, the upper thermostat will shut off the heater and pump of the second heating system, and the recovery of the tank temperature will be completed through the first heating system operating from the lower tank thermostat.

The water heating system of the invention utilizes a series of instantaneous-type water heaters but during periods of low draw, only one of the heaters is actuated. However, in peak periods when large volumes are being drawn, all of the heaters are actuated to provided a rapid recovery of the tank temperature. By only activating one of the heaters during periods of low draw, the economy of operation of the system is substantially improved.

Other objects and advantages will appear in the course of the following description:

The drawing illustrates the best mode presently contemplated of carrying out the invention.

The drawing is a schematic representation of the water heating system of the invention.

The drawing illustrates a water heating system including a hot water storage tank 1 which is adapted to store heated water at a temperature in the range of 80° to 180° F. with the specific temperature depending on the ultimate use of the water. The heated water is discharged from the tank 1 through an outlet conduit 2 in the upper end of the tank and cold water is supplied to the tank through an inlet conduit 3 connected between the lower end of the tank and a cold water supply line 4.

The water is adapted to be heated by a series of instantaneous-type water heaters 5, 6 and 7. Cold water is supplied to the heater 5 through a line 8, which is connected to the cold water supply line 4, and heated water is returned from the heater 5 to the storage tank through a return line 9. The water storage tank 1, inlet conduit 3, supply line 4, line 8, heater 5 and return line 9 comprise a closed flow system and water is pumped through this closed system by a pump 10 which is located in line 8.

The heaters 6 and 7 are connected in a second closed flow system which is separate from the closed system containing the heater 5. In this closed system cold water is supplied to the heater 6 through line 11 which communicates with the cold water supply line 4 and cold water is supplied to the heater 7 through a line 12 which is also connected to the cold water supply line 4. Heated water is returned from the heaters 6 and 7 to the storage tank 1 through lines 13 and 14 which are connected to the heater 6 and 7, respectively, and communicate with the return line 9. Thus the heaters 6 and 7 are connected in parallel in the second closed system which includes the tank 1, conduit, line 4, lines 11 and 12, heaters 6 and 7, lines 13 and 14 and line 9. To circulate water within this second system a pump 15 is located in the line 4 between the connection of line 4 to line 8 and the connection of line 4 to line 11.

To prevent excessive pressures from developing in the systems, conventional relief valves 16 are located in lines 8, 11 and 12. In addition, the water can be drained from the various lines through a series of drain valves 17 which are located in lines 9, 13 and 14.

The water heaters 5, 6 and 7 are of a conventional type in which the water is passed through a heat exchanger and heated by a gas burner. Gas is supplied to the burner through a gas line 18 and the flow of gas within line 18 is controlled by a solenoid-operated gas valve 19. A high temperature limit control 20 is located in each water heater and is responsive to the water temperature therein. The controls 20 are connected in series with the gas valves 19 and act to open the respective circuits if excessive temperatures are encountered. Hot water is discharged from the heaters 5, 6 and 7 and returned to the hot water storage tank 1.

A check valve 21 is located in line 13 downstream of the junction with line 14 and prevents the reverse flow of water through heaters 6 and 7 when pump 10 is operating. The check valve 21 isolates the two closed flow systems. Without the check valve 21, when pump 10 is operating and pump 15 is not operating, water would be pumped in the reverse direction through lines 13 and 14 and through heaters 6 and 7. This type of reverse circulation is not desired for it would result in unnecessary heat loss up the stack.

In accordance with the invention, a pair of thermostats 22 and 23 are located within the hot water storage tank 1. Thermostat 22 is located adjacent the bottom of the tank at a position slightly above the connection of lines 3 and 9 to the tank, while the thermostat 23 is located substantially above the thermostat 22 at a position in the central portion of the tank. Thermostats 22 and 23 are normally set for approximately the same temperature setting.

Thermostat 22 is connected electrically in series with pump 10, and with gas valve 19 and limit control 20 of water heater 5, while thermostat 23 is connected in series with pump 15 and with the gas valves of heaters 6 and 7 as well as with the limit controls 20 of heaters 6 and 7. Limit controls 20 are normally set at a higher temperature setting than the setting of thermostats 22 and 23 and act to open the respective circuits if excessive water temperatures are encountered in the water heaters.

The water in tank 1 will tend to stratify with the higher temperature water being at the top and the lower temperature being at the bottom. When the temperature in the lower portion of the tank falls below the setting of thermostat 22 without water being drawn from the tank, the thermostat 22 will actuate the gas valve 19 of heater 5 to admit gas to the burner and will also actuate the pump 10 to thereby circulate water from tank 1 through lines 3, 4 and 8 to the heater 5 and return heated water through line 9 to the lower end of the tank. When the temperature of the water in tank 1 regains the setting of thermostat 22, the thermostat will act to deactivate the pump 10 and will close the gas valve 19.

During off-peak periods when small volumes of water are drawn from the tank 1 through line 2, cold water will be supplied through line 3 to the lower end of the tank. When the temperature of the water within the lower end of the tank falls beneath the setting of thermostat 22, the thermostat will again act to operate the heater 5 and the pump 10 to thereby circulate water through lines 3, 4 and 8 to the heater 5 and return heated water through line 9 to the tank 1.

If larger volumes of water are drawn from the tank 1 causing correspondingly larger volumes of cool water to enter the tank through line 3, the water temperature in the lower end of the tank will fall below the setting of the lower thermostat 22 and the water temperature in the upper portion of the tank will fall below the setting of upper thermostat 23. When this occurs, thermostat 22 will actuate heater 5 and pump 10 to supply heated water through the first closed system to tank 1 and the thermostat 23 will actuate the heaters 6 and 7, as well as the pump 15, to supply heated water through the second closed system to the tank 1.

As the water temperature increases due to the supply of heated water, the upper thermostat 23 will initially act to shut off the heaters 6 and 7 and pump 15. At this time, the temperature of the water in the lower end of the tank is still beneath the setting of thermostat 22, so that the recovery of the water temperature in tank 1 will be completed by heater 5 operating from the lower tank thermostat 22. As previously mentioned, when the temperature of the water in the lower end of the tank increases to the setting of thermostat 22, the gas valve 19 of heater 5 will be closed and the pump 10 will be stopped.

The present invention provides a water heating system incorporating a series of instantaneous-type heaters in which only a single heater is actuated during off-peak periods of low water draw or when the temperature within the tank falls beneath the setting without any water draw. However, all of the heaters are actuated during periods of large volumes of water draw which enables the water temperature in the tank to be regained very rapidly.

While the above description shows a single heater 5 connected in the first closed system and a pair of heaters 6 and 7 located in the second closed system, it is contemplated that one or more heaters can be connected in both closed systems, depending on the capacity required. Similarly, more than two closed flow systems can be utilized with one or more heaters in each system and a thermostat associated with each system. Furthermore, in some installations more than one storage tank can be incorporated, with the tanks being manifolded in a manner to produce nearly equal flow rates into and out of each tank.

Various modes of carrying out the invention are contemplated as being within the scope of the following claims particularly pointing out and distinctly claiming the subject matter which is regarded as the invention.

We claim:

1. A hot water heating installation, comprising a first closed system including a heated water storage tank, a first water heater, a first supply line connecting the lower portion of said tank to said first heater, a first return line connecting the heater to the lower portion of the tank and pumping means located in said first closed system for circulating water therein; a second closed system including said tank, a second water heater separate from said first heater, a second supply line connecting the lower portion of the tank to said second heater, a second return line connecting the heater to the lower portion of said tank, and second pumping means for circulating water within said second closed system; a hot water outlet conduit connected to the upper portion of said tank; a cold water supply conduit connected to said first and second supply lines; first thermostatic means disposed within the tank adjacent the lower end of said tank and operably connected to said first heating means and said first pumping means; and second thermostatic means located within said tank at a higher level than said first thermostatic means and operably connected to said second heating means and said second pumping means, said first thermostatic means acting to operate said first heating means and said first pumping means when the temperature of the water in the lower portion of the tank falls beneath the setting of said first thermostatic means and said second thermostatic means acting to operate said second heating means and said second pumping means when the temperature of the water at the level of said second thermostatic means falls below the setting of said second thermostatic means.

2. The installation of claim 1, wherein the temperature setting of said first thermostatic means and said second thermostatic means are approximately the same.

3. The installation of claim 1, wherein said second heating means comprises a series of instantaneous-type heaters connected in parallel in said second closed system.

4. The installation of claim 1, wherein said first thermostatic means is located above the position of connection of said first and second return lines to said tank.

5. A hot water heating installation, comprising a heated water storage tank, first heating means, a first supply line connecting the lower portion of said tank to said first heating means, a first return line connecting said first heating means to the lower portion of said tank, said tank, first supply line, first heating means and first return line comprising a first closed flow system, first pumping means disposed in said first flow system for circulating water therethrough, second heating means, a second supply line connecting the lower portion of said tank to said second heating means, a second return line connecting second heating means to the lower portion of said tank, said tank, said second supply line, said second heating means and said second return line comprising a second closed flow system, second pumping means disposed in said second closed flow system, for circulating water therethrough, a cold water inlet line connected to said tank, a heated water outlet line connected to the upper portion of said tank, first thermostatic means mounted within the tank adjacent the lower end thereof, and second thermostatic means mounted in said tank at a location spaced above the position of said first thermostatic means, said first thermostatic means being operably connected to said first heating means and said first pumping means to circulate water through said first closed system when the temperature of the water in the lower end of the tank falls beneath the setting of said first thermostatic means, and said second thermostatic means being operably connected to said second heating means and said second pumping means to circulate water through said second closed flow system when the temperature of the water in the portion of the tank where said second thermostatic means is located falls below the setting of said second thermostatic means.

6. The installation of claim 5, and including check valve means in said second return line for permitting water to flow from said second heating means to said tank but preventing flow of water in the opposite direction.

References Cited

UNITED STATES PATENTS

| 1,731,368 | 10/1929 | Baker | 126—351 |
| 1,908,041 | 5/1933 | Miller | 236—20 |
| 1,991,863 | 2/1935 | Morrow | 126—351 |
| 2,291,023 | 7/1942 | Burklin | 126—362 |
| 2,303,382 | 12/1942 | Newhouse | 236—20 |
| 2,591,400 | 4/1952 | Burklin | 236—23 |

FREDERICK L. MATTESON, Jr., Primary Examiner

ROBERT A. DUA, Assistant Examiner

U.S. Cl. X.R.

126—362; 236—20